United States Patent
Marin Perales et al.

(10) Patent No.: US 10,513,638 B2
(45) Date of Patent: Dec. 24, 2019

(54) ADHESIVE COMPOSITION COMPRISING POLYETHER CARBONATE POLYOLS

(71) Applicant: REPSOL, S.A., Madrid (ES)

(72) Inventors: Laura Marin Perales, Madrid (ES); Sonia Segura Fernandez, Madrid (ES); Carolina Ruiz Orta, Madrid (ES); Rafael Polo Abad, Madrid (ES); María Dolores Blanco Gonzalez, Madrid (ES); José Román Galdamez Peña, Madrid (ES); Mónica Garcia Ruiz, Madrid (ES)

(73) Assignee: REPSOL, S.A., Madrid (ES)

( * ) Notice: Subject to any disclaimer, the term of this patent is extended or adjusted under 35 U.S.C. 154(b) by 0 days.

(21) Appl. No.: 15/749,441

(22) PCT Filed: Aug. 2, 2016

(86) PCT No.: PCT/EP2016/068473
§ 371 (c)(1),
(2) Date: Jan. 31, 2018

(87) PCT Pub. No.: WO2017/021425
PCT Pub. Date: Feb. 9, 2017

(65) Prior Publication Data
US 2018/0223135 A1    Aug. 9, 2018

(30) Foreign Application Priority Data

Aug. 3, 2015 (EP) .................................... 15382412

(51) Int. Cl.
*C09J 123/08* (2006.01)
*C09J 133/08* (2006.01)
*C08L 69/00* (2006.01)

(52) U.S. Cl.
CPC ......... *C09J 123/0853* (2013.01); *C08L 69/00* (2013.01); *C09J 133/08* (2013.01)

(58) Field of Classification Search
CPC .............. C09J 123/0853; C09J 123/869; C09J 133/02; C09J 133/08; C09J 133/10; C09J 133/12; C08L 23/0853; C08L 23/0869; C08L 33/02; C08L 33/08; C08L 33/10; C08L 33/12
See application file for complete search history.

(56) References Cited

U.S. PATENT DOCUMENTS

| | | | |
|---|---|---|---|
| 4,602,056 A | 7/1986 | Waniczek et al. | |
| 5,872,183 A * | 2/1999 | Bonnet | C08K 5/10 525/123 |
| 6,468,650 B1 | 10/2002 | Bohm | |
| 7,465,493 B2 * | 12/2008 | Lu | C09J 133/02 428/355 AC |
| 8,247,520 B2 * | 8/2012 | Allen | C08G 64/0208 528/196 |
| 2002/0028901 A1 * | 3/2002 | Gunatillake | C08G 18/12 528/28 |
| 2005/0137275 A1 | 6/2005 | Nefzger et al. | |
| 2010/0233378 A1 * | 9/2010 | Watanabe | C08G 64/0208 427/385.5 |
| 2011/0111240 A1 | 5/2011 | Yuan et al. | |
| 2012/0083187 A1 * | 4/2012 | Okamoto | B24B 37/24 451/28 |
| 2012/0213992 A1 | 8/2012 | Gerst et al. | |
| 2013/0059973 A1 * | 3/2013 | Wamprecht | C08G 18/10 524/590 |
| 2014/0163149 A1 | 6/2014 | Leisner | |
| 2015/0232606 A1 * | 8/2015 | Wamprecht | C08G 18/44 528/58 |

FOREIGN PATENT DOCUMENTS

| | | |
|---|---|---|
| EP | 1527146 B1 | 10/2009 |
| EP | 2444433 A1 | 4/2012 |
| EP | 2837648 A1 | 2/2015 |
| JP | 2011225734 A * | 11/2011 |
| WO | 2010060038 A1 | 5/2010 |
| WO | 2011163250 A1 | 12/2011 |
| WO | 2013158621 A1 | 10/2013 |
| WO | 2014060348 A2 | 4/2014 |
| WO | WO-2014060348 A2 * | 4/2014 ........... C08G 18/664 |

OTHER PUBLICATIONS

International Search Report dated Sep. 2, 2016 re: Application No. PCT/EP2016/068473; pp. 1-3; citing: EP 2 444 433 A1, WO 2014/060348 A2, EP 1 527 146 B1 and U.S. Pat. No. 6,468,650 B1.
Written Opinion dated Sep. 2, 2016 re: Application No. PCT/EP2016/068473; pp. 1-3; citing: EP 2 444 433 A1, WO 2014/060348 A2, EP 1 527 146 B1 and U.S. Pat. No. 6,468,650 B1.

* cited by examiner

*Primary Examiner* — Nicholas E Hill
(74) *Attorney, Agent, or Firm* — Cantor Colburn LLP

(57) ABSTRACT

An adhesive composition comprising includes (i) a copolymer of an unsaturated hydrocarbon and an acrylate ester or acid, or of an unsaturated hydrocarbon and a vinyl saturated aliphatic ester or mixtures thereof, and (ii) a polyether carbonate polyol wherein the weight proportion of $CO_2$ ranges from 0.5 to 37 wt % with respect to the total weight of the polyether carbonate polyol. The compositions of the invention may be used in PSA or HotMelt adhesive formulations.

26 Claims, No Drawings

ADHESIVE COMPOSITION COMPRISING POLYETHER CARBONATE POLYOLS

TECHNICAL FIELD

The present disclosure relates to a composition comprising a copolymer of an unsaturated hydrocarbon and an acrylate ester or acid, or of an unsaturated hydrocarbon and a vinyl saturated aliphatic ester, and a polyether carbonate polyol.

BACKGROUND

HotMelt adhesives are typically made of a high molecular weight polymer, a tackifier, a wax and a plastizicer formulated so as to display a glass transition temperature below the lowest service temperature and a suitably high melt temperature. Typical high molecular weight polymers used are high molecular weight polyolefins such as polyethylene, polyamides, polyesters synthetized from a diol and a dicarboxylic acid, copolymers of an unsaturated aliphatic hydrocarbon and an acrylate ester or acid (e.g. Ethylene-acrylate copolymer, ethylene-acrylate-maleic anhydride terpolymers, ethylene n-butyl acrylate (EBA), ethylene-acrylic acid (EAA) or ethylene-ethyl acetate (EEA)), polyurethanes such as thermoplastic polyurethanes or reactive polyurethanes, copolymers of an unsaturated aliphatic hydrocarbon and a vinyl aliphatic ester (e.g. Ethylene-vinyl acetate (EVA) copolymers) or styrene block co-polymers. The most widely used tackifiers are resins such as rosin resin or terpenes. HotMelt adhesives are applied hot over the adhered typically by use of an electric hot glue gun, but also through spraying or dipping. Upon cooling, the adhesive marries the adhered. Some of the compounds mentioned in the literature as plasticizers are glycerol, ethylene glycol, propylene glycol or polyether polyols (see for example, US 2014/163149—Avery Dennison Corp., or EP 2 499 194 B1—Adhesives Research). PSA adhesives represent a broader kind of adhesives which marry the adhered by application of pressure. PSA can be made of an elastomer and a tackifier, some of which are also used in HotMelt compositions. Typical elastomers used are vinyl ethers, copolymers of an acrylate esters or acids (e.g. Ethylene-acrylate copolymer, ethylene-acrylate-maleic anhydride terpolymers, ethylene n-butyl acrylate (EBA), ethylene-acrylic acid (EAA) or ethylene-ethyl acetate (EEA)), nitriles, copolymers of an unsaturated aliphatic hydrocarbon and a vinyl aliphatic ester (e.g. Ethylene-vinyl acetate (EVA) copolymers) or styrene block co-polymers. The most widely used tackifiers are also resins such as rosin resin. Exemplary compositions of traditional HotMelt or PSA compositions are disclosed in many patents such as U.S. Pat. No. 4,602,056 (Bayer) or US 2012/213992 (BASF), respectively.

Some documents also mention the possibility of incorporating polyalkylenecarbonates (PAC), such as polypropylenecarbonate (e.g. Eternacoll® of UBE or Duranol of Asahi), also known as polyol polycarbonates (e.g. US 2005/137275), and which are polymers resulting from the reaction of diols like 1,3-propanediol, 1,4-butanediol, 1,6-hexanediol, diethylene glycol, triethylene glycol, tetraethylene glycol or thiodiglycol, with organic carbonates, for example diphenyl carbonate or dimethyl carbonate, or with phosgene (see for example (U.S. Pat. No. 5,872,183)), and are thus polycarbonates with essentially 100% carbonate links:

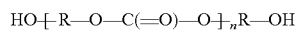

For example, EP 1 527 146 B1 (Cytec Surface Specialties, S.A.) discloses a PSA adhesive comprising a. an acrylate copolymer; b. at least a polyol selected from the group consisting of polyester polyols, acrylic polyols, polycarbonate polyols and polyether polyols; and c. at least one transition metal complex as cross-linking agent. No further information is given about the polycarbonate polyols mentioned, and all examples refer to polyether polyols. All the above have drawbacks, such as the need to use large amounts of resins or the need to use of crosslinkers.

In the same way, U.S. Pat. No. 6,468,650 discloses a mixture of specific EVA co-polymers and polyether polyols which can be capped with terminal groups. Concretely, the polyether polyol can be of formula $XO-[(CH_2)_4-O]-Y$ (1) or of $XO-[(CH(CH_3)-CH_2-O]-Y$ (2), wherein, X and Y are selected from the group consisting of H—, $(C_nH_{2n+1})$— where n is from 1 to 20, $CH_2-CHCO-$, $CH_3CH(NH_2)CH_2-$, 2,3-epoxypropyl, $C_6H_5-CO-$, and $CH_2-C(CH_3)-CO-$. All examples make use of polyether polyols.

On the other hand, polymers which can improve the carbon footprint of industrial processes have drawn considerable attention in response to increasing environmental awareness and stricter regulation. One family of these polymers are carbonate polyols, which are the result of the reaction between an epoxide and $CO_2$, and thus help in capturing carbon dioxide. In these polymers the epoxide and $CO_2$ can completely alternate so as to provide copolymers which backbone essentially comprise carbonate linkages, that is a polymer similar to PACs (or polyol polycarbonates) or, on the other hand, provide copolymers wherein the epoxide and $CO_2$ can form blocks resulting in a backbone which has, both, carbonate and ether links, that is, were the carbon dioxide is randomly inserted between blocks of polyether (known as polyether carbonate polyols).

Totally alternate, i.e. polycarbonate polyols, are described for example in WO 2011/163250 and WO 2013/158621A (Novomer), and are prepared using Co-Salen type catalysts. These polymers thus have a similar backbone to those polycarbonates shown in the above formula, made with essentially 100% carbonate links. Such polycarbonate polyols are then used to produce polyurethanes.

Adhesives made of aliphatic polycarbonates are disclosed in WO 2010/060038 (Novomer), also prepared using Co-Salen type catalysts, and which have a carbonate linkage above 85%; according to the authors carbonate linkages below 90% are not suitable for adhesives. Further polyether carbonate polyols are disclosed in the co-pending application EP15382178.0 or in EP 2 837 648 (REPSOL), which are prepared by co-polymerization of an epoxide and $CO_2$ in the presence of a double metal cyanide (DMC) catalyst, and on the contrary present low carbonate linkage percentage; said polyether carbonate polyols are used for the preparation of polyurethanes.

SUMMARY

The present disclosure provides compositions based on a copolymer of an unsaturated hydrocarbon and an acrylate ester or acid, or a copolymer of an unsaturated hydrocarbon and a vinyl saturated aliphatic ester. The inventors have found that the addition of polyether carbonate polyols provides adhesive compositions with surprisingly improved properties. According to a first aspect, the disclosure therefore provides a composition comprising (i) a copolymer of an unsaturated hydrocarbon and an acrylate ester or acid, or of an unsaturated hydrocarbon and a vinyl saturated aliphatic ester or mixtures thereof, and (ii) a polyether carbonate polyol wherein the weight proportion of $CO_2$ in the polyether carbonate polyol ranges from 0.5 to 37 wt % with respect to the total weight of the polyether carbonate polyol.

When incorporating said compositions into HotMelt and PSA formulations, compositions with acceptable adhesiveness are obtained with reduced amounts of tackifying agents, and thus a second aspect of the disclosure is a PSA or HotMelt adhesive formulations comprising the composition of the disclosure.

It is a third aspect of the disclosure a method for the adhesion of at least two adherends comprising the application at a temperature below 200° C. of a composition according to the disclosure to at least one of said adherends. The inventors have come to realize that the compositions of the disclosure provide HotMelt adhesives suitable for application at temperatures which are lower to those currently used and it is thus an embodiment of the disclosure a method for the adhesion of at least two adherends comprising the application at a temperature below 150° C., preferably below 120° C., more preferably below 120° C., even more preferably, below 110° C., of a composition according to the disclosure to at least one of said adherends. In an embodiment of the disclosure the application temperature is between 10° C. and 120° C., for example, between 20 and 110° C. It is a fourth aspect of the disclosure said adhered comprising the composition of the disclosure.

A fifth aspect is a method for the synthesis of the composition of the disclosure which comprises mixing (i) a copolymer of an unsaturated hydrocarbon and an acrylate ester or acid, or a copolymer of an unsaturated aliphatic hydrocarbon and a vinyl aliphatic ester or mixtures thereof, and (ii) a polyether carbonate polyol wherein the weight proportion of $CO_2$ in the polyether carbonate polyol ranges from 0.5 to 37 wt % with respect to the total weight of the polyether carbonate polyol.

DESCRIPTION OF THE DISCLOSURE

Unless otherwise indicated, weight percentages, indicated as "wt. %", "wt %" or "w/w" or "% by weight" are given as a percentage with respect to the total weight of the composition.

"Mw" refers to Weight Average Molecular Weight. The weight average molecular weight in the present disclosure has been calculated by gel permeation chromatography (GPC) with polystyrene (for the copolymers of unsaturated hydrocarbons) or PEG (for polyether carbonate polyols) gel under measurement conditions as follows. A molecular weight was calibrated with a polystyrene or PEG standard sample.

Measurement Conditions of GPC:
concentration of sample: 0.25% by weight (in THF)
injection amount of sample: 100 μl
eluent: THF
flow rate: 1.0 ml/min
measurement temperature: 40° C.
column: one column of "K-G" (trade name)+two columns of "K-804L" (trade name) (available from Shodex)
detector: differential refractometer (attached to a GPC apparatus, "HLC-8220GPC" (trade name, Tosoh Corporation))
polystyrene standard sample: "TSK standard POLYSTYRENE F-10" (molecular weight: 102,000), F-1 (molecular weight: 10,200), A-1000 (molecular weight: 870) (available from Tosoh Corporation), and "POLYSTYRENE STANDARD" (molecular weight: 900,000-30,000; Nishio Kogyo Kabushiki Kaisya).
PEG standard sample: "Easivials PEG Standard" PL2070-0201. Each standard contains a mixture of three narrow polydipersity polyethylene standard (Molecular weight: 32680, 8130, 1030-20440, 3830, 620-1560, 1470,425)

Polyether Carbonate Polyol

The polyether carbonate polyols used in the compositions of the disclosure have a weight proportion of $CO_2$ from 0.5 to 37 wt % with respect to the total weight of the polyether carbonate polyol, and thus are polyether carbonate polyols wherein $CO_2$ groups are randomly incorporated in the chemical structure thereof.

The preparation of polyether carbonate polyols can be made according to an embodiment of the disclosure by a process comprising copolymerizing one or more H-functional initiator substances, one or more alkylene oxides and carbon dioxide in the presence of a double metal cyanide catalyst. Such processes are described, for example, in the co-pending application EP15382178.0 or in EP2 83 7648, and which comprises copolymerizing one or more H-functional initiator substances, one or more alkylene oxides and carbon dioxide in the presence of a double metal cyanide catalyst, wherein said double metal cyanide catalyst is obtained by a process comprising:

a) synthesizing a solid double metal cyanide catalyst in the presence of an organic complexing agent and a polyether polyol ligand; and b) first washing the catalyst obtained in step a) with an aqueous solution comprising:
90-100% by weight of water; and
0-10% by weight of a polyether polyol ligand,
to form a slurry, wherein the aqueous solution does not contain any organic complexing agent other than the polyether polyol ligand.

In a particular embodiment, said process for the preparation of the DMC catalyst further comprises:

c) isolating the catalyst from the slurry obtained in step b); and d) washing the solid catalyst obtained in step c) with a solution comprising:
90-100% by weight of an organic complexing agent, and
0-10% by weight of a polyether polyol ligand.

The polyether carbonate polyols useful for the compositions of the disclosure are not limited to those disclosed in said co-pending application. It is thus an embodiment of the disclosure a composition comprising (i) a copolymer of an unsaturated hydrocarbon and an acrylate ester or acid, or a copolymer of an unsaturated aliphatic hydrocarbon and a vinyl aliphatic ester or mixtures thereof, and (ii) a polyether carbonate polyol wherein the weight proportion of $CO_2$ ranges from 0.5 to 37 wt % with respect to the total weight of the polyether carbonate polyol, obtainable by a process comprising copolymerizing one or more H-functional initiator substances, one or more alkylene oxides and carbon dioxide in the presence of a double metal cyanide catalyst.

The polyether carbonate polyol can be present in the disclosure in many different amounts, and can be adjusted in each case for fine-tuning. Typical amounts of polyether carbonate polyol are between 0.01 and 95 wt % with respect to the total weight of the composition, for example, between 1 and 70 wt %, between 5 and 60 wt %, between 8 and 50 wt % or between 10 and 40 wt % with respect to the total weight of the composition. It is a further embodiment of the disclosure a composition comprising (i) 20-95%, alternatively 30-95 wt %, with respect to the total weight of the composition of a copolymer of an unsaturated hydrocarbon and an acrylate ester or acid, or a copolymer of an unsaturated aliphatic hydrocarbon and a vinyl aliphatic ester or mixtures thereof, and (ii) 5-60% by weight with respect to the total weight of the composition of a polyether carbonate polyol wherein the weight proportion of $CO_2$ ranges from 0.5 to 37 wt % with respect to the total weight of the polyether carbonate polyol, obtainable by a process comprising copolymerizing one or more H-functional initiator substances, one or more alkylene oxides and carbon dioxide in the presence of a double metal cyanide catalyst. The composition of the disclosure is obtainable by the mixture of components (i) and (ii) as defined above.

The term "epoxide" or "alkylene oxide" are considered equivalents and, as used herein, refer to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

There a large number of epoxides that the skilled can use for the present disclosure, depending on the properties which are envisioned for the adhesives. Typically, alkylene oxides have from 2 to 24 carbon atoms. Examples of said alkylene oxides include, among others, one or more compounds selected from the group consisting of optionally substituted ethylene oxide, propylene oxide, butene oxides, pentene oxides, hexene oxides, heptene oxides, octene oxides, nonene oxides, decene oxide, undecene oxides, dodecene oxides, cyclopentene oxide, cyclohexane oxide, cycloheptene oxide, cyclooctene oxide and styrene oxide. Substituted alkylene oxides preferably refer to alkylene oxides substituted with a $C_1$-$C_6$ alkyl group, preferably methyl or ethyl. Preferred alkylene oxides are ethylene oxide, propylene oxide, butene oxide, styrene oxide and mixtures thereof, such as mixtures of ethylene oxide and propylene oxide. In a particular embodiment, the alkylene oxide is propylene oxide.

The term "polymer", as used herein, refers to a molecule of high relative molecular mass, the structure of which comprises the multiple repetition of units derived, actually or conceptually, from molecules of low relative molecular mass.

According to an embodiment of the disclosure, the polyether carbonate polyol is a polyol comprising terminal hydroxyl groups and comprising fragments of a polymer of formula (A):

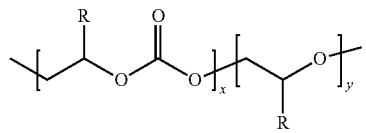

wherein R is hydrogen or a $C_1$-$C_{22}$ aliphatic saturated hydrocarbon, x is a number between 1 and 500 and y is a number between 2 and 500, with the proviso that y is greater than x. According to an embodiment of the disclosure each of x and y is greater than 2, preferably greater than 3.

The polyether carbonate polyol of the disclosure can also comprise at least one fragment of formula (A) wherein y is 2 or more, for example, 2 to 500, and x is between 1 and 500, and wherein the weight proportion of $CO_2$ in the polyether carbonate polyol ranges from 0.5 to 37 wt % with respect to the total weight of the polyether carbonate polyol.

The term "H-functional initiator substance" refers to a compound having H atoms active for the alkoxylation, such as, for example, alcohols, primary or secondary amines, or carboxylic acids. Suitable H-functional initiator substances include one or more compounds selected from the group consisting of mono- or poly-hydric alcohols, polyvalent amines, polyvalent thiols, aminoalcohols, thioalcohols, hydroxy esters, polyether polyols, polyester polyols, polyester ether polyols, polyether carbonate polyols, polycarbonate polyols, polycarbonates, polyethyleneimines, polyether amines, polytetrahydrofurans, polytetrahydrofurana mines, polyether thiols, polyacrylate polyols, castor oil, the mono- or di-glyceride of ricinoleic acid, monoglycerides of fatty acids, chemically modified mono-, di- and/or tri-glycerides of fatty acids, and $C_1$-$C_{24}$-alkyl fatty acid esters that contain on average at least 2 hydroxyl groups per molecule.

In a particular embodiment, the H-functional initiator substance is a polyhydric alcohol also known as polyol, more particularly is a polyether polyol, preferably having an number molecular weight from 100 to 4,000 Da. More preferably, the polyether polyol has a functionality from 2 to 8, i.e., it has from 2 to 8 hydroxyl groups per molecule, even more preferably it is a diol or a triol.

Suitable polyether polyols include poly(oxypropylene) polyols, ethylene oxide-capped poly(oxypropylene) polyols, mixed ethylene oxide-propylene oxide polyols, butylenes oxide polymers, butylenes oxide copolymers with ethylene oxide and/or propylene oxide, polytetra methylene ether glycols and the like. Most preferred are poly(oxypropylene) polyols, particularly having from two to eight hydroxyl groups, more preferably diols and triols, having number average molecular weights lower than 2,000 Da, more preferably between 200 and 1,000 Da, even more preferably between 300 and 800 Da.

More preferably, the polyether polyol used as the H-functional initiator substance has been synthesized by acidic catalysis, i.e. by polymerizing an epoxide in the presence of active hydrogen-containing initiator and acidic catalysts. Examples of suitable acidic catalysts include Lewis acids such as $BF_3$, $SbF_5$, $Y(CF_3SO_3)_3$, or Brönsted acids such as $CF_3SO_3H$, $HBF_4$, $HPF_6$, $HSbF_6$.

In a particular embodiment, the H-functional initiator substance is a polyether polyol that has been synthesized by acidic catalysis. Preferably, it is a polyether polyol that has been synthesized by acidic catalysis and has a number average molecular weight lower than 2,000 Da, preferably between 200 and 1,000 Da and more preferably between 300 and 800 Da.

The polyether carbonate polyol used in the mixture of the disclosure has a functionality of at least two, preferably from two to eight, even more preferably a functionality of 2 or 3, i.e. two or three hydroxyl groups per molecule. Thus, the polyether carbonate polyol is preferably a polyether carbonate diol or a polyether carbonate triol, even more preferably is a polyether carbonate triol. This functionality coincides with the functionality of the H-functional starter substance used to prepare it.

In a particular embodiment, the weight average molecular weight (Mw) of the polyether carbonate polyol is higher than 500 Da, preferably higher than 1,000, more preferably higher than 5,000 Da. According to a further embodiment, the weight average molecular weight (Mw) of the polyether carbonate polyol ranges from 500 to 150,000 Da, preferably from 1,000 to 100,000 Da.

The molar amount of $CO_2$ incorporated in the resulting polyether carbonate polyol was determined by means of $^1$H-NMR (Bruker AV III HD 500, 500 MHz, pulse program zg30, waiting time d1:1 s, 120 scans). The sample was dissolved in deuterated chloroform. The relevant resonances in the $^1$H-NMR (based on TMS=0 ppm) are as follows: Cyclic carbonate=1.50 ppm (3H); Polyether carbonate polyol=1.35-1.25 ppm (3H); Polyether polyol: 1.25-1.05 ppm (3H).

Taking into account the relative intensities, the polymer-bonded carbonate (linear carbonate, LC) in the reaction mixture was converted to mol % according to the following formula (I):

$$LC = F(1.35-1.25) \times 100 / (F(1.50) + F(1.35-1.25) + F(1.25-1.05)) \quad (I)$$

wherein:
F(1.50): resonance area at 1.50 ppm for cyclic carbonate (corresponds to 3H atoms);
F(1.35-1.25): resonance area at 1.35-1.25 ppm for polyether carbonate polyol (corresponds to 3H atoms);
F(1.25-1.05): resonance area at 1.25-1.05 ppm for polyether polyol (corresponds to 3H atoms).

The amount by weight (in wt. %) of polymer bonded carbonate (LC*) in the reaction mixture was calculated according to formula (II):

$$LC^* = F(1.35-1.25) \times 102 \times 100 / N \quad (II)$$

wherein the value for N ("denominator" N) was calculated according to formula (III):

$$N = F(1.35-1.25) \times 102 + F(1.50) \times 102 + F(1.25-1.05) \times 58 \quad (III)$$

The factor 102 results from the sum of the molar masses of $CO_2$ (molar mass 44 g/mol) and of propylene oxide (molar mass 58 g/mol), whereas the factor 58 results from the molar mass of propylene oxide which must be adjusted in each case according to the alkylene oxide used.

The amount by weight (in wt. %) of $CO_2$ in polymer was calculated according to formula (IV):

$$\% \; CO_2 \text{ in polymer} = LCp \times 44/102 \quad (IV)$$

wherein the value for LCp was calculated according to formula (V):

$$LCp = F(1.35-1.25) \times 102 \times 100 / Np \quad (V)$$

Wherein the value for Np mas calculated according to formula (VI):

$$Np = F(1.35-1.25) \times 102 + F(1.25-1.05) \times 58 \quad (VI)$$

The factor 102 results from the sum of the molar masses of $CO_2$ (molar mass 44 g/mol) and of propylene oxide (molar mass 58 g/mol), whereas the factor 58 results from the molar mass of propylene oxide, which must be adjusted in each case according to the alkylene oxide used.

According to an embodiment of the disclosure, the molar $CO_2$ content is below 50% with respect to the total moles of the polyether carbonate polyol, preferably below 40%, more preferably below 30%, alternatively between 5% and 40%, preferably between 10% and 30%.

Preferably, the polyether carbonate polyol has from 5 to 30 wt % of carbon dioxide, preferably from 10 to 30 wt %, even more preferably from 10 to 25 wt % based on the total weight of the polyether carbonate polyol.

Preferably, the polyether carbonate polyol is made by copolymerization of $CO_2$ and propylene and/or ethylene oxide and has from 5 to 30 wt % of carbon dioxide, preferably from 10 to 30 wt %, even more preferably from 10 to 25 wt % based on the total weight of the polyether carbonate polyol.

The polyether carbonate polyol of the disclosure are characterized by a low percentage of carbonate links. In an embodiment of the disclosure the percentage of carbonate linkages below 80%, alternatively below 75%, more preferably below 70%, even more preferably below 60% with respect to the total carbonate and ether links in the chain.

Copolymer of an Unsaturated Hydrocarbon and an Acrylate Ester or Acid, or Copolymer of an Unsaturated Hydrocarbon and a Vinyl Saturated Aliphatic Ester or Mixtures Thereof The compositions of the disclosure include a copolymer of an unsaturated hydrocarbon and a acrylate ester or acid, or a copolymer of an unsaturated hydrocarbon and a vinyl saturated aliphatic ester or mixtures thereof.

Thus, for example, suitable acrylates, are those comprising $C_1$-$C_{22}$ alkyl esters. Suitable alkyl acrylate monomers include ethyl acrylate, butyl acrylate, 2-ethylbenzyl acrylate, lauryl acrylate, cetyl acrylate, stearyl acrylate, eicosyl acrylate and mixtures thereof as well as the corresponding methacrylate monomers. According to an embodiment of the disclosure, said acrylate is methyl, ethyl or butyl acrylate. Said acrylate ester or acids can be copolymerized with other monomers reactive to radical polymerization, such as for example $C_1$-$C_4$ alkylenes (e.g. ethylene, propylene or butylene). Thus, according to a further embodiment of the disclosure, said acrylate is copolymerized with ethylene. According to an embodiment of the disclosure said acrylate ester or acid has the following formula (X) $CH_2=C(R_1)C(=O)OR_2$, wherein $R_1$ is hydrogen or a $C_1$-$C_4$ aliphatic saturated hydrocarbon, and $R_2$ is hydrogen or a $C_1$-$C_8$ aliphatic saturated hydrocarbon.

According to a further embodiment, said copolymer of an unsaturated aliphatic hydrocarbon and a vinyl aliphatic ester is the copolymer of a $C_1$-$C_4$ alkylene, such as ethylene, propylene or butylene, and a saturated aliphatic vinyl ester, such as a vinyl $C_1$-$C_4$ saturated aliphatic ester. According to an embodiment of the disclosure, said copolymer of an unsaturated aliphatic hydrocarbon and a vinyl aliphatic ester is ethylene-vinyl acetate (EVA) copolymer. According to an embodiment of the disclosure, said EVA has a vinyl acetate content of between 8 wt % and 50 wt %, for example, between 15 wt % and 50 wt %, for example between 18 wt % and 45 wt %.

According to an embodiment of the disclosure, the copolymer of an unsaturated hydrocarbon and an acrylate ester or acid, or a copolymer of an unsaturated aliphatic hydrocarbon and a vinyl aliphatic ester or mixtures thereof is present in the composition in amounts of 20-95 wt % with respect to the total weight of the composition.

According to an embodiment of the disclosure, the copolymer of an unsaturated hydrocarbon and an acrylate ester or acid, or a copolymer of an unsaturated aliphatic hydrocarbon and a vinyl aliphatic ester or mixtures thereof may be present in the composition in amounts of 1 to 99 wt %, for example, in amounts from 5 to 98 wt %, from 10 to 97 wt %, from 20 to 96 wt % or from 30 to 95 wt % with respect to the total weight of the composition, alternatively in amounts from 5 to 95 wt % or from 40 to 95 wt % or from 60 to 95 wt % with respect to the total weight of the composition.

For example, the composition may comprise (i) 5-95 wt % with respect to the total weight of the composition of a copolymer of an unsaturated hydrocarbon and an acrylate ester or acid, or of an unsaturated hydrocarbon and a vinyl saturated aliphatic ester or mixtures thereof, and (ii) 0.01-95 wt % with respect to the total weight of the composition of said polyether carbonate polyol. Also, it may comprise (i) 10-97 wt % with respect to the total weight of the composition of a copolymer of an unsaturated hydrocarbon and an acrylate ester or acid, or of an unsaturated hydrocarbon and a vinyl saturated aliphatic ester or mixtures thereof, and (ii) 3-60 wt % with respect to the total weight of the composition of said polyether carbonate polyol. In a further non-limiting example, the skilled person can prepare a composition comprising (i) 60-95 wt % with respect to the total weight of the composition of a copolymer of an unsaturated hydrocarbon and an acrylate ester or acid, or of an unsaturated hydrocarbon and a vinyl saturated aliphatic ester or mixtures thereof, and (ii) 5-40 wt % with respect to the total weight of the composition of said polyether carbonate polyol.

The monomers typically polymerize by free-radical polymerization in the presence of a solvent, and the monomers are preferably pre-polymerized prior to being combined with the polyether carbonate polyol. Any suitable free radical initiator may be used; exemplary initiators include, but are not limited to, peroxy and/or azo compounds. In a similar fashion, any suitable non-aqueous solvent may be used and can include ethyl acetate; toluene; hydrocarbons such as heptane or hexane; alcohols; and combinations thereof, all by way of example only.

Adhesives

The compositions of the disclosure can act directly as Pressure sensitive adhesives (PSA), such as HotMelt, or can be formulated with further additives. The compositions of the disclosure are prepared by conventional methods, for example, by mixing the components neat or in a solvent. In an embodiment, mixing of the components to a homogeneous melt takes places at a temperature from 100 to 200° C., preferably from 105 to 180° C. This process can be carried out in an extruder.

The adhesive of the disclosure can be detached again from the substrate surfaces. Preferably, the pressure sensitive adhesives of the disclosure are used to reversibly bond two substrates or adherends. The hot melt adhesives of the disclosure may be used to bond a broad spectrum of different solid substrates. These substrates may be flexible or, alternatively, rigid. Preferably, one of the substrates to be bonded is thin and flexible, in the form more particularly of films, multi-layer films, paper, aluminum, or multi-layer constructions from paper, aluminium and polymer films.

The pressure sensitive adhesives according to the disclosure can be used to bond substrates such as glass, metal, ceramic, wood, coated or uncoated paper, paperboard packaging and plastics, such as, for example, polyethylene terephthalate (PET), polyethylene naphthalate (PEN), polyamide (PA), polypropylene (PP) and polyethylene (PE), polyvinyl chloride (PVC) and polystyrene (PS). Thin flexible substrates such as films, multi-layer films or paper can then be glued to such solid substrates.

The adhesive composition of the disclosure is preferably used to bond plastic substrates, particularly substrates made of polyethylene, polypropylene, polystyrene, polyvinyl chloride polyethylene terephthalate, polyamide, polyethylene naphthalate or cellophane. In a particular embodiment, the adhesive of the disclosure is used for reversible bonding of two flexible substrates. The disclosure further provides the bonded, preferably reversibly bonded, substrates comprising the hot melt adhesive of the disclosure.

In an embodiment, the adhesive of the disclosure is used in the manufacture of packaging or parts of packaging such as lids, trays, containers, pouches, flow packs or blisters for food, pharmaceuticals, cosmetics as well as industrial applications. In a particular embodiment, the adhesive of the disclosure is used in the manufacture of resealable packaging or parts of resealable packaging for food products. The disclosure is also directed to the packaging or parts of packaging, such as lids, trays, containers, bags, pouches, flow packs or blisters, comprising the adhesive of the disclosure.

The tack in all cases in the present application was measured according EN 14510:2005 wherein (see example 2 for details):

(a) 2 g of the sample were placed on a steel plate (7×7×0.01 cm) which was heated at 180° C. and then allowed to cool on a smooth surface to give a homogeneous film thickness;

(b) the sample was then introduced in a TA.XT2i Texture Analyzer (Stable Microsystems, Surrey, England) fitted with a thermally insulated chamber covered with aluminum, wherein temperature was controlled by an external thermocouple;

(c) the temperature was adjusted to the desired temperature of measurement and determined by a thermocouple placed in contact with the sample; and (d) a cylindrical stainless steel rod or probe (3 mm diameter) with smooth flat end was used to measure the force necessary to separate it from the adhesive surface, the testing experimental conditions being the following:

approach speed of the cylindrical probe to the sample: 0.1 mm/s force applied to the sample: 5 N time of application of the force: 1 s separation speed (pulling rate) of the cylindrical probe from the sample: 1 mm/s Additives HotMelt compositions typically use waxes, and any which is compatible with the rest of the components of the mixture can be used in the present disclosure. The wax is added to the mixture in a amounts between 1 wt % and 40 wt % with respect to the total weight of the composition, for example between 5 wt % and 30 wt %, preferably between 10 wt % and 25 wt %. By way of example, the most popularly used waxes are paraffin waxes, microcrystalline waxes, Fischer-Tropsch synthetic waxes, and polyethylene waxes. Examples of types of waxes that may be used include natural waxes, partially synthetic waxes and fully synthetic waxes. Natural waxes are formed through biochemical processes and are products of animal or plant metabolism. Partially synthetic waxes are formed by chemically reacting natural waxes. Fully synthetic waxes are prepared by polymerizing low molar mass starting materials such as carbon, methane, ethane or propane. The two main groups of fully synthetic waxes are the Fischer-Tropsch waxes and polyolefin waxes such as polyethylene wax, polypropylene wax and copolymers thereof (see for example, Ullmann's Encyclopedia of Industrial Chemistry).

The adhesives of the disclosure may comprise tackifiers. The compositions of the disclosure have resulted in adhesive compositions (e.g. HotMelt adhesives) which require surprisingly low amounts of tackifier and can even dispense with its use, which represents an embodiment of the disclosure, i.e. a composition of the disclosure not comprising any tackifying agent. Thus, according to an embodiment of the disclosure, the composition of the disclosure comprises (i) between 70 and 95 wt %, e.g. 75-90 wt %, of a copolymer of an unsaturated hydrocarbon and an acrylate ester or acid, or copolymer of unsaturated hydrocarbon and a vinyl saturated aliphatic ester or mixtures thereof; and between 10 wt % and 30 wt % of a polyether carbonate polyol wherein the weight proportion of $CO_2$ ranges from 0.5 to 37 wt % with respect to the total weight of the polyether carbonate polyol; and comprises no tackifier.

According to an alternative embodiment, the composition of the disclosure does comprise tackifying agent. For example, the tackifying agent can be present in amounts 30-40 wt % with respect to the total weight of the composition. These amounts can be reduced in the compositions of the disclosure, which may comprise according to an alternative embodiment between 0 and 30 wt % with respect to the total weight of the composition, preferably between 0 and 10 wt % with respect to the total weight of the composition. Thus, according to an embodiment of the disclosure, the composition of the disclosure comprises (i) between 30 and 60 wt %, e.g. 30-50 wt %, of a copolymer of an unsaturated hydrocarbon and an acrylate ester or acid, or a copolymer of an unsaturated aliphatic hydrocarbon and a vinyl aliphatic ester or mixtures thereof; (ii) between 20 wt % and 50 wt % of polyether carbonate polyol wherein the weight proportion of $CO_2$ ranges from 0.5 to 37 wt % with respect to the total weight of the polyether carbonate polyol; and (iii) between 10 wt % and 50 wt %, preferably between 10 wt % and 30 wt %, of a tackifier.

The term "tackifier" or "tackifying agent" is recognized in the art and includes those substances that provide tack to adhesive compositions. The tackifying agent is typically a resin and can be, but is not limited to, rosin resins, hydrocarbon resins, terpene resins and derivatives thereof.

In an embodiment, the tackifying resin is selected from rosin resins (also called colophony resins), rosin ester resins, fully or partly hydrogenated rosin resins, disproportionated rosin resins, fully or partly hydrogenated rosin ester resins, disproportionated rosin ester resins; aromatic, aliphatic or cycloaliphatic hydrocarbon resins, derivatives thereof, and fully or partly hydrogenated aromatic, aliphatic or cycloaliphatic hydrocarbon resins; terpene resins, terpene polymers and copolymers, phenol-modified terpene resins and hydrogenated derivatives thereof. In a particular embodiment, the at least one tackifying resin is a hydrocarbon resin or a derivative thereof. Preferably, it is selected from aromatic, aliphatic or cycloaliphatic hydrocarbon resins, derivatives thereof, and fully or partly hydrogenated aromatic, aliphatic or cycloaliphatic hydrocarbon resins.

In an embodiment of the disclosure, the adhesive composition comprises as tackifying only a rosin resin or a derivative thereof, such as a fully or partly hydrogenated rosin resin, disproportionated rosin resin, a rosin ester resin, a fully or partly hydrogenated rosin ester resin or a disproportionated rosin ester resin. Preferably, only a rosin ester resin or a derivative thereof, such as a fully or partly hydrogenated rosin ester resin or a disproportionated rosin ester resin. More preferably, only a hydrogenated rosin ester resin, such as a glycerol ester of hydrogenated rosin.

The compositions of the disclosure may further comprise further usual additives used in the preparation of PSA adhesives compositions. The adhesive composition of the disclosure can comprise one or more further additives. Preferably, the composition of the disclosure comprises 0 to 5 wt. % of one or more further additives, based on the total weight of the composition. In a particular embodiment, it comprises 0.01 to 5 wt. % of one or more further additives, preferably 0.01 to 3 wt. %, more preferably 0.05 to 2 wt. %, even more preferably 0.05 to 0.5 wt. %. Typical additives of hot melt or PSA adhesives are well known in the art. Examples of these additives include antioxidants, such as sterically hindered phenols, phosphites, thioethers or thioesters; stabilizers; antislipping agents, such as amide derivatives; colorants, such as titanium dioxide; fillers, such as talc, clay and calcium carbonate.

The composition of the disclosure can optionally include plasticizers (e.g., benzoates such as 1,4-cyclohexane dimethanol dibenzoate, glyceryl tribenzoate, or pentaerythritol tetrabenzoate, phthalates, paraffin oils, polyisobutylene, chlorinated paraffins, etc.). Suitable adhesives can be obtained with the compositions of the disclosure without the need of plasticizers. In a particular embodiment, the composition of the disclosure does not comprise plasticizers.

In a particular embodiment, the composition of the disclosure does not comprise plasticizer and/or tackifying agent. In a further embodiment, the composition of the disclosure does not comprise tackifying agents and/or crosslinking agents.

In an embodiment, the composition of the disclosure comprises 0.1 to 5 wt. % of at least one plasticizer, based on the total weight of the composition. Alternatively, it comprises from 0.5 to 5 wt. %, for example from 1 to 5 wt. %, of at least one plasticizer. In a particular embodiment, the at least one plasticizer is selected from medicinal white oils, mineral oils, vegetal or animal oils; alkyl esters of aliphatic or aromatic carboxylic acids, such as adipates, sebacates, phthalates, citrates, benzoates, mellitates and aromatic sulphonates; alcohols, glycols or polyols, including polyether polyols and polyester polyols; and mixtures thereof. In an embodiment, the at least one plasticizer is an oil. Preferably, it is selected from medicinal white oils (also called paraffin oils), mineral oils, vegetal oils and animal oils.

In a preferred embodiment, the at least one plasticizer is a medicinal white oil, preferably a saturated mineral hydrocarbon, more preferably a saturated mineral hydrocarbon with a number molecular weight of 200 to 800, even more preferably 500. In another embodiment, the at least one plasticizer is selected from alcohols, glycols and polyols.

In a particular embodiment, the composition of the disclosure comprises 0 to 5 wt. % of at least one antioxidant, based on the total weight of the adhesive composition. In a particular embodiment, it comprises 0.01 to 5 wt. % of at least one antioxidant, preferably 0.01 to 3 wt. %, more preferably 0.05 to 2 wt. %, even more preferably 0.05 to 0.5 wt. %.

In an embodiment, the at least one antioxidant is selected from sterically hindered phenols, phosphites and mixtures thereof. Preferably, it is a mixture of a sterically hindered phenol and a phosphite. Sterically hindered phenols are well known in the art and refer to phenolic compounds which contain sterically bulky radicals, such as tert-butyl, in close proximity to the phenolic hydroxyl group thereof. In particular, they may be characterized by phenolic compounds substituted with tert-butyl groups in at least one of the ortho positions relative to the phenolic hydroxyl group. In a particular embodiment, the sterically hindered phenol has tert-butyl groups in both ortho-positions with respect to the hydroxyl group. Representative hindered phenols include pentaerythritol tetrakis(3-(3,5-di-tert-butyl-4-hydroxyphenyl)propionate), 1,3,5-trimethyl-2,4,6-tris(3,5-di-tert-butyl-4-hydroxybenzyl) benzene, n-octadecyl-3(3,5-di-tert-butyl-4-hydroxyphenyl) propionate, 4,4'-methylenebis(4-methyl-6-tert-butylphenol), 4,4'-thiobis(6-tert-butyl-o-cresol), 6-(4-hydroxyphenoxy)-2,4-bis(n-ocytlthio)-1,3,5-triazine, 2,4,6-tris(4-hydroxy-3,5-di-tertbutyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, and sorbitol hexa-(3,3,5-di-tert-butyl-4-hydroxy-phenyl) propionate.

In a particular embodiment, phosphites are aromatically substituted phosphites, preferably substituted or unsubstituted triphenyl phosphites. Examples of these phosphites include triphenyl phosphite, trisnonylphenyl phosphite, and tris(2,4-di-tert butylphenyl)-phosphite.

In a particular embodiment, the composition of the disclosure comprises 0.05 to 0.5 wt. % of at least one antioxidant selected from sterically hindered phenols, aromatically substituted phosphites and mixtures thereof. In an embodiment, the antioxidant is a mixture of a sterically hindered phenol and an aromatically substituted phosphite, e.g. a mixture of pentaerythritol tetrakis(3-(3,5-di-tert-butyl-4-hydroxyphenyl)propionate) and tris(2,4-di-tert-butylphenyl)-phosphite.

Further additives that can be included in the compositions of the disclosure can be selected from the following:
Stabilizers;
fillers for reducing cost, adding bulk, improving cohesive strength (forming an aggregate-matrix composite material) and altering properties; e.g., calcium carbonate, barium sulfate, talc, silica, carbon black, clays (e.g., kaolin);
UV stabilizers which protect the material against degradation by ultraviolet radiation;
pigments and dyes;
biocides for hindering bacterial growth;
flame retardants;
antistatic agents:
ferromagnetic particles, hygroscopic water-retaining materials, or other materials which can yield a composition which can be activated by microwave heating; and/or
electrically conductive particles which can yield conductive hot-melt formulations.

EXAMPLES

Glosary of Terms

PolyolPC1: polyolether carbonate polyol (diol) with weight average molecular weight (Mw) of 12,000 Da and $CO_2$ content of 15.5 wt % with respect to the total weight of the polyether carbonate polyol.

PolyolPC2: polyolether carbonate polyol (diol) with weight average molecular weight (Mw) of 90,000 Da and $CO_2$ content of 25 wt % with respect to the total weight of the polyether carbonate polyol.

PolyolPC3: polyolether carbonate polyol (diol) with weight average molecular weight (Mw) of 65,000 Da and $CO_2$ content of 16 wt % with respect to the total weight of the polyether carbonate polyol.

PolyolPC4: polyolether carbonate polyol (triol) with weight average molecular weight (Mw) of 5,000 Da and $CO_2$ content of 19 wt % with respect to the total weight of the polyether carbonate polyol.

Polyol1: reference polyether polyol (triol) with weight average molecular weight (Mw) of 5,000 Da and without any content of $CO_2$.

Polyol2: reference polyether polyol (diol) with weight average molecular weight (Mw) of 10,000 Da and without any content of $CO_2$.

Polyol3: reference polyester polyol (diol) with no ether linkages. P-6010 Kuraray with weight average molecular weight (Mw) of 6,000 Da.

Polyol4: reference polycarbonate diol with no ether linkages. C-3090 Kuraray with weight average molecular weight (Mw) of 3,000 Da. The polycarbonate diol used as comparative Polyol 4 is characterized for having a carbonate group in each monomeric unit.

EVA PA410: EVA ALCUDIA® 410 from REPSOL having a vinyl content of 18 wt % and MFI (190° C. 2.16 kg) of 150 g/10 min.

EVA PA442: EVA ALCUDIA® 442 from REPSOL having a vinyl content of 28 wt % and MFI (190° C. 2.16 kg) of 150 g/10 min.

EBA 27150: EBA ALCUDIA® 27150 from REPSOL having a butyl acrylate content of 27 wt % and MFI (190° C., 2.16 kg) of 150 g/10 min.

Tackifiers: Piccolyte® C115: Polyterpenic resin (Pinova, Brunswick, Germany); Foralyn™ 90: Ester of Hydrogenated Rosin (Eastman Chemical Company).

Wax: microcrystalline Ibercer 3080 wax (Iberceras Madrid, Spain).

Example 1: General Mixing Procedure for the Preparation of Mixtures

The compositions of the disclosure where prepared by mixing the components at high temperature, typically approximately 170° C., under stirring using procedures known in the art. The components of the compositions and their wt % with respect to the total weight of the composition are summarized in table 1 below. Also included in table 1 are some comparative examples

TABLE 1 summary of the compositions

| Mix | Component (i) | Component (ii) | Tackifier | Wax |
|---|---|---|---|---|
| 1 | 80% EVA PA410 | 20% PolyolPC1 | | |
| 2 | 80% EVA PA442 | 20% PolyolPC2 | | |
| 3 | 50% EVA PA442 | 50% PolyolPC2 | | |
| 4 | 80% EVA PA442 | 20% PolyolPC1 | | |
| 5 | 80% EVA PA442 | 20% PolyolPC3 | | |
| 6 | 80% EVA PA442 | 20% PolyolPC4 | — | — |
| 7 (Comparative) | 80% EVA PA442 | 20% Polyol1 | — | — |
| 8 (Comparative) | 80% EVA PA442 | 20% Polyol2 | — | — |
| 9 | 80% EBA PA27150 | 20% PolyolPC3 | — | — |
| 10 (comparative) | 40% EVA PA 442 | — | 40% Piccolyte C115 | 20% Ibercer 3080 wax |
| 11 (comparative) | 40% EVA PA 442 | — | 40% Foralyn 90 | 20% Ibercer 3080 wax |
| 12 (comparative) | 40% EBA PA27150 | — | 40% Piccolyte C115 | 20% Ibercer 3080 wax |

TABLE 1-continued summary of the compositions

| Mix | Component (i) | Component (ii) | Tackifier | Wax |
|---|---|---|---|---|
| 13 | | 50% Mix 2 | 30% Foralyn 90 | 20% Ibercer 3080 wax |
| 14 | | 45% Mix 2 | 35% Foralyn 90 | 20% Ibercer 3080 wax |
| 15 | | 40% Mix 2 | 40% Piccolyte C115 | 20% Ibercer 3080 wax |
| 16 | | 40% Mix 9 | 40% Foralyn 90 | 20% Ibercer 3080 wax |
| 17 (Comparative) | 80% EVA PA410 | 20% Polyol3 | — | — |
| 18 (Comparative) | 80% EVA PA442 | 20% Polyol3 | — | — |
| 19 (Comparative) | 80% EVA PA410 | 20% Polyol4 | — | — |

All mixtures according to the disclosure showed good compatibility and provided stable compositions. However, blends of the comparative examples could be prepared, but formed an oily surface after a short time.

Example 2: Properties of Adhesiveness and Viscosity

The adhesiveness of the compositions of the disclosure was tested.

Tack: For the measurement of hot tack texture, a TA.XT2i Texture Analyzer (Stable Microsystems, Surrey, England) was used. Each sample was placed in a thermally insulated chamber covered with aluminum, wherein temperature can be controlled by an external thermocouple. Measurement of tackiness (also referred to as tack) was performed at different temperatures between 23° C. and 100° C., the temperature being determined by a thermocouple placed in contact with the sample.

Samples were prepared by depositing about 2 g of the obtained mixture on a steel plate (7×7×0.01 cm) which was heated at 180° C. and then allowed to cool on a smooth surface to give a homogeneous film thickness.

A cylindrical stainless steel rod (3 mm diameter) with smooth contact was used to measure the peeling force necessary to separate from the adhesive. The testing experimental conditions were the following:

approach speed of the rod to the sample: 0.1 mm/s
force applied to the sample: 5 N
time of application force: 1 s
separation speed of the rod from the sample: 1 mm/s
Peeling T Test on Canvas Adhesive properties were tested under T-peeling conditions in adhesive constructions canvas-hotmelt-canvas. Canvas is a type of fabric used in painting. It is porous and has a texture similar to cardboard and book loins, which are frequently adhered using thermofusing adhesives.

For adhering the canvas, 30×150 mm probes where used without any surface treatment at the side not painted. The adhesive was applied with a spatula at 180° C. (temperature was controlled through a Brookfield Thermosel) over one of the proves, and then a 0.88 MPa pressure was applied for 10 seconds using a hydrolic press. T-peeling tests were taken after 1 hour (final adhesion) the adhesion operations. For this purpose a Instron 4411 universal machine was used at a peeling speed of 10 mm/min, and the type of peeling as determined visually.

Measurement of the Open Time

The hot melt adhesive has to be melted at 180° C. by using a heating system Thermosel (Brookfield, Middleboro, USA). The substrate is a single wall board cardboard with 30×70 mm dimensions. Five replicas for each measurement of open time were carried out so five identical pieces of cardboard were cut. Each piece of cardboard is folded in half for quick measurement.

The folded cardboard piece is handled on the left hand between the thumb and the middle finger. Then, a small amount of melted adhesive is taken by using a spatula (enough sample to be able to cover the whole joining area, 30×30 mm) and it is quickly applied in the bottom side of the cardboard piece, pressing immediately by approaching the finger to the thumb for different times. The time is controlled using a chronometer and once the required time passed, the joint is leaving to fall into a table. If the joint is maintained closed, the open time is overpassed; if the joint tends to open, then the open time is not obtained.

Because five replicas are measured, the open time can be expressed as percentage, i.e. 100%, means that the 5 joints remain jointed or 60% means that 3 pieces are adhered and 2 are not.

The viscosity of the melt adhesive was measured at 180° C. and different shear rates using Brookfield RD DV-I viscometer with Thermosel and SC4-27 spindle.

The softening point was measured in Mettler Toledo FP900 Thermosystem calorimeter (Schwerzenbach Mettler Toledo GmbH, Germany). Hole diameter of sample cups for determination of softening point was 6.35 mm.

As can be observed from the experimental results of binary mixtures, the composition according to the present disclosure provides improved adhesion properties (peeling) vs ethylene copolymers of reference. (Table 2). For example, EVA PA442 showed a significantly lower value in the peel test than all the corresponding binary compositions according to the disclosure (Mixtures 2-5). Tack are quite enough for the application and, advantageously, can be applied at lower temperature than ethylene copolymers of reference.

TABLE 2

Adhesion properties (tack and peel) of ethylene copolymers and polyether polycarbonate polyol vs ethylene copolymers of reference

| Mix | Maximum Tack (kPA) | Max. Tack temperature (° C.) | Peel test (N/m) |
|---|---|---|---|
| EVA PA410 | 432 | 120 | 78 |
| 1 | 243 | 105 | 85 |
| EVA PA442 | 544 | 120 | 99 |
| 2 | 347 | 110 | 143 |
| 3 | 177 | 85 | 130 |
| 4 | 315 | 100 | 121 |
| 5 | 342 | 90 | 114 |
| EBA PA27150 | 564 | 95 | 81 |
| 9 | 324 | 80 | 104 |
| 17 (Comparative) | 111 | 40 | No adhesion |
| 18 (Comparative) | 137 | 40 | No adhesion |
| 19 (Comparative) | 58 | 40 | No adhesion |

Additionally, when an equivalent polyol without $CO_2$ (Table 3) is added to the ethylene copolymer, compared with a polyether polycarbonate polyol of similar molecular weight and functionality, viscosity drops, and tack and adhesiveness performance are much worse (that means lower tack and peel, and higher open time), proving that the effect of the polyether polycarbonate polyol is not as plasticizer of the mixture, but that it surprisingly improves the adhesive properties of the composition. In fact, the comparative blends 17, 18 and 19, prepared with polyester polyols or polycarbonate polyols having no ether linkages, provide no adhesiveness at all in the peel test. On the other hand, all the samples according to the disclosure prepared with polyether polycarbonate polyols (which do contain ether blocks) provided good results in terms of maximum tack and peel test.

Again, it can be noted that the comparative blends 17, 18 and 19 perform poorly. The use of polyester polyols or polycarbonate polyols having no ether linkages leads to blends with increased open time results, indicating a decrease adhesiveness when compared with the blends of the disclosure.

The invention claimed is:

1. A composition comprising
   (i) a copolymer of an unsaturated hydrocarbon and an acrylate ester or acid, or of an unsaturated hydrocarbon and a vinyl saturated aliphatic ester or mixtures thereof, and
   (ii) a polyether carbonate polyol wherein the weight proportion of $CO_2$ in the polyether carbonate polyol ranges from 0.5 to 37 wt % with respect to the total weight of the polyether carbonate polyol,

TABLE 3

Effect of a polyether polycarbonate polyol on adhesion and viscosity properties of a copolymer of ethylene compared to a standard polyol plasticizer

| | Component ii (Polyol) | | | Maximum Tack | Viscosity | Open time | | Peel test |
|---|---|---|---|---|---|---|---|---|
| Mix | Mw Polyol | Functionality | $CO_2$ | (kPA) | (Pa · s) | Open time | % Joints | (N/m) |
| 7 (Comparative) | 5,000 | Triol | NO | 99 | 14.79 | 10 s | 0% | 61 |
| | | | | | | 30 s | 0% | |
| | | | | | | 60 s | 60% | |
| 6 | | | YES | 191 | 71.99 | 1 s | 0% | 131 |
| | | | | | | 10 s | 60% | |
| | | | | | | 30 s | 100% | |
| 8 (comparative) | 10,000 | Diol | NO | 212 | 20.55 | 10 s | 0 | 67 |
| | | | | | | 30 s | 0 | |
| | | | | | | 60 s | 0 | |
| 2 | | | YES | 347 | 78.14 | 1 s | 0% | 143 |
| | | | | | | 10 s | 100% | |

Hot Melt Mixtures

When a composition according to the present disclosure, as the mixtures showed in Table 2, is incorporated in a hot melt composition (including wax and a tackifier agent), viscosity, softening point, and adhesiveness performance (peel and open time) are kept almost invariable, even when the amount of tackifier is lowered. The incorporation of polyether carbonate polyol provides hotmelt formulations with similar performance to standard ones but with improved sustainability by incorporating $CO_2$ and, surprisingly, the possibility of reducing the tackifier amount.

The results are summarized in table 4.

wherein the composition is an adhesive composition.

2. The composition according to claim 1, wherein the composition is a non-polyurethane adhesive composition.

3. The composition according to claim 1, wherein the composition has a maximum tack, as measured according to EN 14510:2005, of 177 kPa or above.

4. The composition according to claim 1, wherein the composition has a maximum tack, as measured according to EN 14510:2005, from 177 kPa to 347 kPa.

5. The composition according to claim 1, wherein the copolymer of an unsaturated hydrocarbon and a vinyl aliphatic ester is ethylene vinyl acetate.

TABLE 4

Adhesiveness (peel and open time) and application temperature (viscosity)

| | Peel test | Open time | | Viscosity | Softening Point |
|---|---|---|---|---|---|
| Mix | (N/m) | Open time | % Joints | (Pa · s) | (° C.) |
| 10 (comparative) | 363 | 30 s | 100% | 1.85 | 80.9 |
| 15 | 301 | 30 s | 100% | 1.29 | 79.4 |
| 11 (comparative) | 352 | 15 s | 100% | 1.97 | 84.6 |
| 13 | 338 | 15 s | 100% | 2.12 | 85.0 |
| 14 | 347 | 15 s | 100% | 2.02 | 84.5 |
| 12 (comparative) | 265 | 15 s | 100% | 2.05 | 84.5 |
| 16 | 281 | 15 s | 100% | 2.02 | 85.1 |
| 17 Comparative | No adhesion | 60 s | 100% | 154 | 131 |
| 18 Comparative | No adhesion | 60 s | 100% | 115 | 128 |
| 19 Comparative | No adhesion | 60 s | 100% | 153 | 131 |

6. The composition according to claim 5, wherein said copolymer of an unsaturated hydrocarbon and an acrylate ester or acid is a copolymer of ethylene.

7. The composition according to claim 5, wherein the weight proportion of $CO_2$ in the polyether carbonate polyol ranges from 5 to 30 wt % with respect to the total weight of the polyether carbonate polyol.

8. The composition according to claim 5, wherein said ethylene vinyl acetate has a vinyl acetate content of between 8 wt % and 50 wt %.

9. The composition according to claim 8, wherein said acrylate ester or acid has the formula $CH_2=C(R_1)C(=O)OR_2$, wherein $R_1$ is hydrogen or a $C_1$-$C_4$ aliphatic saturated hydrocarbon, and $R_2$ is hydrogen or a $C_1$-$C_8$ aliphatic saturated hydrocarbon.

10. The composition according to claim 8, wherein said copolymer of an unsaturated hydrocarbon and an acrylate ester or acid is a copolymer of ethylene.

11. The composition according to claim 1, wherein said acrylate ester or acid has the formula $CH_2=C(R_1)C(=O)OR_2$, wherein $R_1$ is hydrogen or a $C_1$-$C_4$ aliphatic saturated hydrocarbon, and $R_2$ is hydrogen or a $C_1$-$C_8$ aliphatic saturated hydrocarbon.

12. The composition according to claim 11, comprising
  (i) 5-95 wt % with respect to the total weight of the composition of a copolymer of an unsaturated hydrocarbon and an acrylate ester or acid, or of an unsaturated hydrocarbon and a vinyl saturated aliphatic ester or mixtures thereof, and
  (ii) 0.01-95 wt % with respect to the total weight of the composition of said polyether carbonate polyol.

13. The composition according to claim 11, comprising
  (i) 20-95 wt % with respect to the total weight of the composition of a copolymer of an unsaturated hydrocarbon and an acrylate ester or acid, or of an unsaturated hydrocarbon and a vinyl saturated aliphatic ester or mixtures thereof, and
  (ii) 5-60 wt % with respect to the total weight of the composition of said polyether carbonate polyol.

14. The composition according to claim 11, wherein the composition has a maximum tack, as measured according to EN 14510:2005, of 177 kPa or above.

15. The composition according to claim 11, wherein the composition has a maximum tack, as measured according to EN 14510:2005, from 177 kPa to 347 kPa.

16. The composition according to claim 1, wherein said copolymer of an unsaturated hydrocarbon and an acrylate ester or acid is a copolymer of ethylene.

17. The composition according to claim 1, wherein the weight proportion of $CO_2$ in the polyether carbonate polyol ranges from 5 to 30 wt % with respect to the total weight of the polyether carbonate polyol.

18. The composition according to claim 17, wherein the weight average molecular weight (Mw) of the polyether carbonate polyol is above 500 Da.

19. The composition according to claim 1, wherein the weight average molecular weight (Mw) of the polyether carbonate polyol is above 500 Da.

20. The composition according to claim 1, comprising
  (i) 5-95 wt % with respect to the total weight of the composition of a copolymer of an unsaturated hydrocarbon and an acrylate ester or acid, or of an unsaturated hydrocarbon and a vinyl saturated aliphatic ester or mixtures thereof, and
  (ii) 0.01-95 wt % with respect to the total weight of the composition of said polyether carbonate polyol.

21. The composition according to claim 1, comprising
  (i) 20-95 wt % with respect to the total weight of the composition of a copolymer of an unsaturated hydrocarbon and an acrylate ester or acid, or of an unsaturated hydrocarbon and a vinyl saturated aliphatic ester or mixtures thereof, and
  (ii) 5-60 wt % with respect to the total weight of the composition of said polyether carbonate polyol.

22. The composition according to claim 1, not comprising at least one of tackifying agents and cross-linking agents.

23. The composition according to claim 22, wherein the composition has a maximum tack, as measured according to EN 14510:2005, of 177 kPa or above.

24. The composition according to claim 22, wherein the composition has a maximum tack, as measured according to EN 14510:2005, from 177 kPa to 347 kPa.

25. A pressure sensitive adhesive or hot melt adhesive formulation comprising the composition defined in claim 1.

26. An adherend comprising a composition as defined in claim 1.

* * * * *